United States Patent [19]

Ksenych

[11] 4,070,059
[45] Jan. 24, 1978

[54] GRAIN TRAILER

[76] Inventor: Nick Ksenych, 1130 Skyline Drive, Watertown, S. Dak. 57201

[21] Appl. No.: 672,883

[22] Filed: Apr. 2, 1976

[51] Int. Cl.$^2$ ............................................. B60P 1/58
[52] U.S. Cl. ................................. 298/1 V; 214/83.3; 222/243; 366/128; 298/27
[58] Field of Search ..................... 298/1 V, 27, 29, 31, 298/32, 33, 34; 221/200; 222/198, 199, 243, 244, 246; 259/37, DIG. 42; 214/83, 83.32, 83.3, 308

[56] References Cited

U.S. PATENT DOCUMENTS 3,227,323   1/1966   Hill .................................. 222/244 X Primary Examiner—Robert J. Spar
Assistant Examiner—George F. Abraham
Attorney, Agent, or Firm—Berman, Aisenberg & Platt

[57] ABSTRACT

A low profile material carrier which, in a preferred embodiment, comprises a grain trailer with a low rear opening for dumping. Most of the load, approximately 80%, dumps through the opening under the influence of gravity. The remaining portion of the load is assisted through the opening by a unique vibrator assembly attached to an interior sloping surface of the trailer. The assembly includes an elongated vibrator bar, which extends the length of and is parallel to the downwardly sloping surface of the trailer which leads to the opening. A motor driven shaft having a plurality of eccentric weights positioned thereon is located intermediate the vibrator bar and the inclined bottom surface and is attached to the bar by a plurality of bearings. Upon actuation of the motor, the shaft, and hence the bar, are vibrated so as to serve as a direct stimulus for the emptying of the material in contact therewith.

14 Claims, 10 Drawing Figures

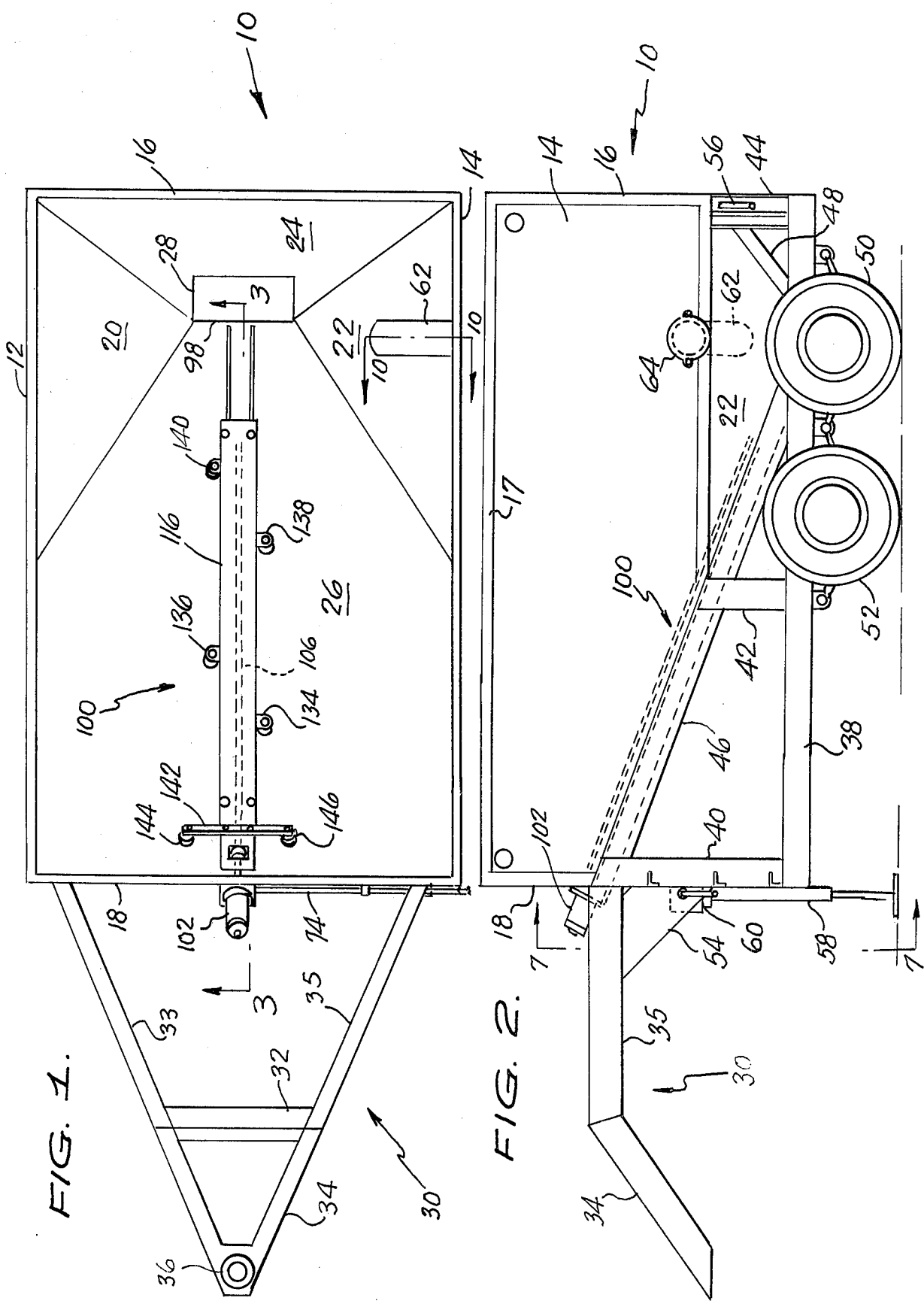

GRAIN TRAILER

BACKGROUND OF THE INVENTION

1. Field of the Invention

The present invention is related to material carriers and, more particularly, is directed towards a low profile grain trailer which utilizes both gravity and a mechanical assist for dumping the contents thereof.

2. Description of the Prior Art

The prior art is replete with material carriers, such as grain trailers, which are emptied through an opening formed in the lower portion thereof under the influence of gravitational forces. Exemplary U.S. patents of which I am aware include Tucker (U.S. Pat. No. 3,521,930), McCurdy (U.S. Pat. No. 2,827,204), Birdsall (U.S. Pat. No. 3,700,293) and Meharry (U.S. Pat. No. 3,337,068).

The Tucker patent (U.S. Pat. No. 3,521,930) for example, describes a grain trailer which includes side and end walls that slope downwardly towards a centrally formed opening in order to provide a gravity feed for the material contained therein.

Each of the above-cited prior art gravity beds are similar in that they have a relatively high profile in order to provide the necessary angular inclination of the side walls thereof incident to a 100% gravity feed operation.

Such high profiles result in a high weight distribution of the load relative to the road and thus may give rise to instabilities or require special reinforcing and/or stabilizing means in order to properly and safely distribute the load. Such stabilizing and/or reinforcing structures tend to be costly and hence should be avoided if at all possible.

One of the ways to perhaps avoid such costs and simultaneously improve the weight distribution of the load would be to lower the profile of such grain trailers by lowering the angle of inclination of its side walls. However, in present designs of grain trailers, a lowering of the profile would lead to a situation where the material contained therein would not be entirely emtied under the force of gravity, such that some type mechanical assist may be necessary.

While the prior art does teach the utilization of various mechanical assist devices that augment the normal gravity emptying of a container (see, for example, U.S. Pat. Nos. 1,942,581; 2,624,479; and 3,747,980), none suggest the unique vibration imparting assembly, nor its use in combination with a low profile grain trailer of the present invention, in the manner which is to be described in more detail hereinafter.

OBJECTS AND SUMMARY OF THE INVENTION

It is therefore a primary object of the present invention to provide an over-the-road low profile material carrier which results in a lower weight distribution of the material in the carrier with respect to the road.

Another object of the present invention is to provide a low profile material carrier, such as a grain trailer, which utilizes the force of gravity to distribute a major portion of the load, and which utilizes a unique mechanical vibration assembly to distribute the remaining portion of the load.

An additional object of the current invention is to provide a low profile grain trailer which utilizes a small angle of inclination of the bottom wall thereof in combination with a unique vibrator bar assembly for emptying the contents of the trailer.

A still further object of the invention is to provide a grain trailer which has a lower profile that results in a lower weight distribution of the load to the road to render the trailer more stable in operation.

A still further object of the present invention is to provide a unique vibration assembly for a low profile grain trailer which is in intimate contact with the material carried therein and, when actuated, efficiently assists in the emptying thereof through the normal gravity feed opening.

The foregoing and other objects are attained in accordance with one aspect of the present invention through the provision of a material carrier which comprises a container for material that includes a bottom wall inclined so as to substantially gravity feed the contents of the container to an opening formed in the lower portion thereof and a vibrator means mounted on the interior surface of the inclined bottom wall for assisting in the emptying of the material through the opening. The inclined bottom wall slops downwardly from a front vertical wall rearwardly to an opening, the latter of which is positioned substantially rearwardly of the mid-length of the container, at an angle of approximately 20°.

In accordance with other aspects of the present invention, the vibrator means include an elongated vibrator bar which is attached to the interior surface of the inclined bottom wall and which extends substantially the entire length of the inclined bottom wall from the front vertical wall to a gravity feed opening. The vibrator means further comprises a motor having a driven shaft, a drive shaft which extends longitudinally between the vibrator bar and the inclined bottom wall, and means for coupling the driven shaft with the drive shaft. Mounted to the drive shaft are a plurality of eccentric weights for causing the shaft to vibrate when rotating. Bearing means are included for coupling the vibratory motion of the drive shaft to the vibrator bar, the latter being spaced from and substantially paralled to the inclined bottom wall and being attached thereto at several places along its periphery by a plurality of L-shaped flanges and one or more elongate retainer bars which may be fixedly secured and transversely positioned with respect to the vibrator bar. The end of the vibrator bar closest to the gravity fed opening may have one or more rod-like/elongate members connected thereto which assist in the material-emptying function thereof.

In accordance with yet other aspects of the present invention, the material carrier may comprise a vehicular grain trailer that includes an auger opening located in one of the side walls thereof. The grain trailer may include a front jack assembly having a rotating handle for the actuation thereof, the handle being pivotable out of the way when not in use. The grain trailer may further include a rear door which covers the gravity-fed opening and means for opening and closing the rear door. The last-mentioned means may comprise a rotatable shaft laterally displaced from the rear door and means for coupling the rotational movement of the shaft to the rear door. A drive shaft for the rotatable shaft has a handle formed at one end thereof, the distal end of which includes a transversely positioned pin formed therethrough which selectively engages a similarly sized pin-receiving slot formed in the cooperating end of the rotatable shaft. The drive shaft is manually axially moveable with respect to the rotatable shaft for selective engagement therewith, and hence, actuation of said opening and closing means for said rear door.

BRIEF DESCRIPTON OF THE DRAWINGS

The foregoing and other objects, aspects, uses and advantages of the present invention will be more fully appreciated as the same beomes better understood when considered in connection with the following detailed description of the present invention viewed in conjunction with the accompanying drawings, in which:

FIG. 1 is a top, plan view illustrating a grain trailer constructed in accordance with a preferred embodiment of the present invention;

FIG. 2 is a side view of the preferred embodiment grain trailer illustrated in FIG. 1;

DETAILED DESCRIPTION OF THE PREFERRED EMBODIMENTS

Figure 3:
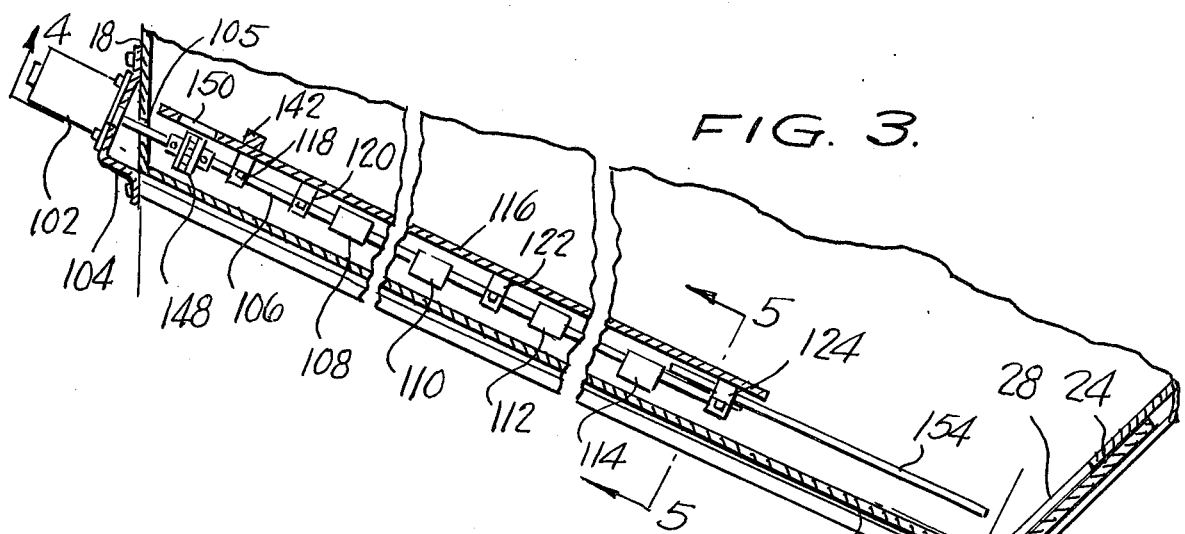
FIG. 3 is a sectional view of a preferred embodiment of the vibrator bar assembly of the present invention taken along line 3—3 of FIG. 1.
Figure 4:
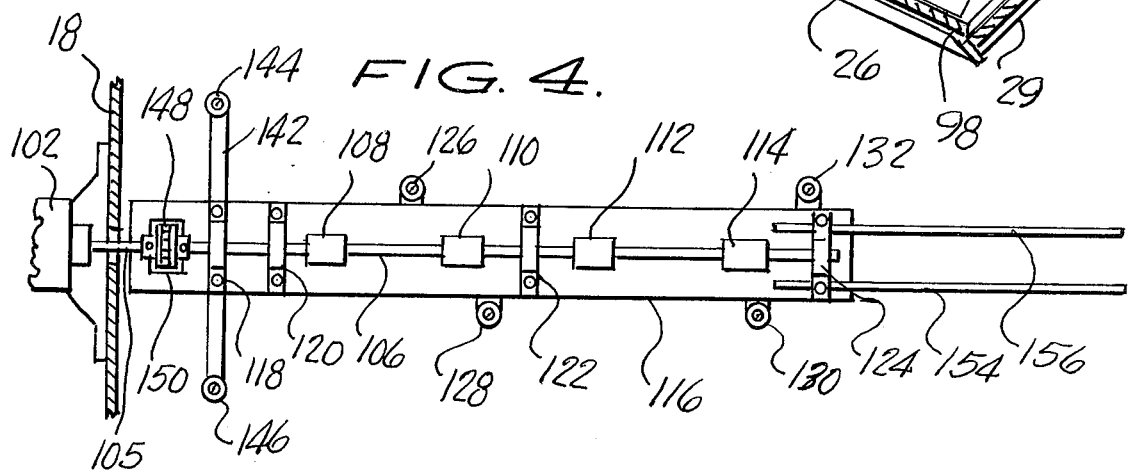
FIG. 4 is another view of the vibrator bar assembly of the present invention taken along line 4—4 of FIG. 3.
Figure 5:
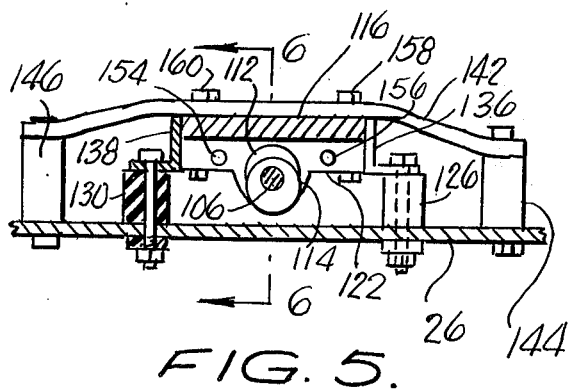
FIG. 5 is a cross-sectional view illustrating structural detail of the vibrator bar assembly taken along line 5—5 of FIG. 3.
Figure 6:
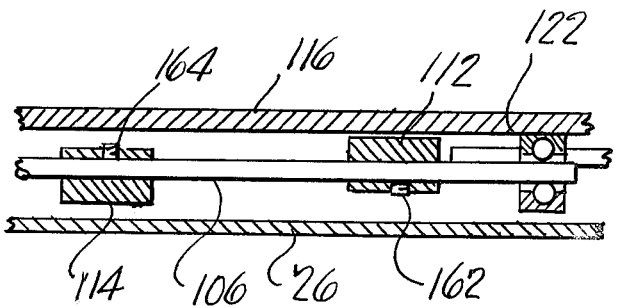
FIG. 6 is another sectional view of the vibrator bar assembly in accordance with a preferred embodiment of the present invention and taken along line 6—6 of FIG. 5.

Referring now to the drawings, wherein like reference numerals designate identical or corresponding parts throughout the several views, and more particularly to FIGS. 1 and 2 thereof, there is depicted a preferred embodiment of the material carrier of the present invention illustrated as a grain trailer and indicated generally by the reference numeral 10.

Grain trailer 10 comprises a pair of parallel, planar and vertical oriented side walls 12 and 14, a rear wall 16, and a front wall 18. The upper edges of walls 12, 14, 16 and 18 form a substantially horizontal planar opening 17 through which grain or other material is deposited into the trailer 10.

Figure 8:
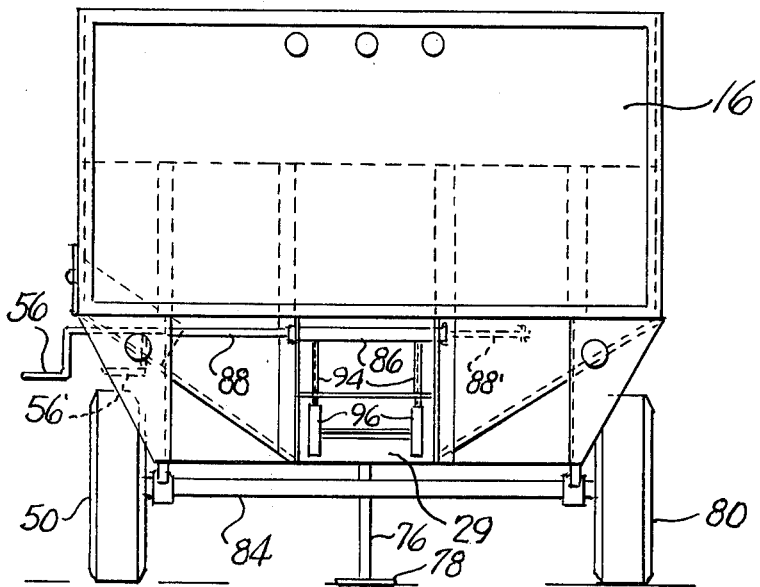
FIG. 8 is a rear end view of the preferred embodiment of the grain trailer illustrated in FIG. 2.

An opening 28 is located in the lower most portion of grain trailer 10 through which the grain or other material may be unloaded or dumped. Opening 28 is normally closed by a pivotable door 29 (FIG. 8). Extending between the lower edge of front wall 18 and the gravity-fed opening 28 is a bottom wall or section 26. The bottom wall or section 26 of grain trailer 10 is inclined at an angle of approximately 20° from the horizontal and comprises the main inclined surface for gravity feeding the contents of trailer 10 to opening 28.

Extending downwardly from the rear wall 16 is an inclined bottom section 24. Extending downwardly from side wall 12 towards opening 28 and having a pair of edges which section 20, while extending downwardly from side wall 14 is a similarly shaped side wall section 22, sections 20 and 22 being generally triangular in shape.

On the front end of grain trailer 10 is disposed a draw bar assembly indicated generally by the reference numeral 30. Draw bar assembly 30 comprises a horizontally, disposed U-shaped member which comprises a pair of legs 33 and 35 and a connecting arm 32. Legs 33 and 35 are extended forwardly from a vertical frame support member 40. A diagonal support member 54 extends between horizontal legs 33, 35 and vertical member 40 to provide additional support therefor.

The draw bar assembly 30 further comprises a downwardly extending triangular member 34 which which has a pivot-receiving aperture 36 formed at the frontal portion thereof for pivotable attachment to a towing vehicle, such as a pick-up truck or the like.

Figure 7:
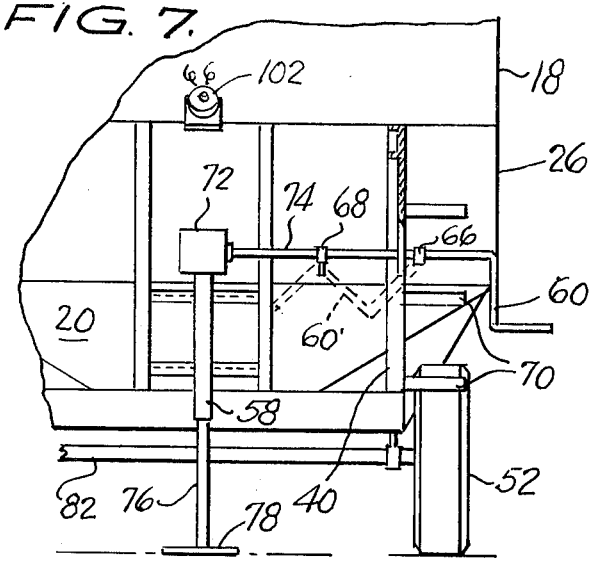
FIG. 7 is a partial frontal end view of the grain trailer illustrated in FIG. 2.

The supporting frame structure for grain trailer 10 generally comprises a lower horizontal frame support member 38 to which the front and rear axles 82 and 84 of wheels 50, 52 and 80 are secured (FIGS. 2, 7 and 8). Secured to horizontal frame support member 38 are a plurality of upwardly extending vertical frame support members 40, 42 and 44. An inclined frame support member 46 extends from the upper portion of vertical frame support member 40 down through support member 42 to opening 28 of grain trailer 10, where it is met by a second inclined frame support member 48 that extends from opening 28 up to the rear vertical frame member 44.

A frontwardly disposed jack assembly 58, illustrated with more particularity in FIG. 7, includes a jack handle 60 having a shaft 74 transversely extending through a pair of supports 66 and 68 to a gear box 72. Support 66 further serves as a pivot point for jack handle 60 whose fold-away travel position is indicated in dotted outline and by the reference numeral 60'. Support 68 may further include a lower hooked portion to facilitate storage of the folded jack handle 60'. Extending from main housing 58 of the jack assembly under the control of gear box 72 is a vertical support member 76 to the bottom of which is attached a horizontal support member 78. Also illustrated in FIG. 7 are a plurality of steps 70 which may be welded to the vertical frame member 40 to facilitate access to the inside of grain trailer 10.

Figure 10:
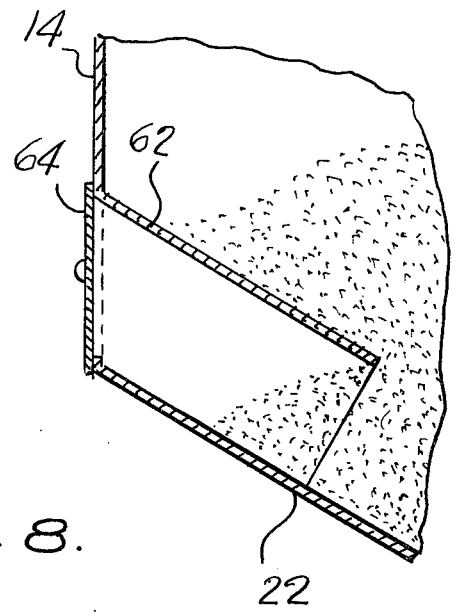
FIG. 10 is a sectional view of an auger opening taken along line 10—10 of FIG. 1.

Referring now to FIGS. 1, 2 and 10, the grain trailer 10 of the present invention may include an auger opening 62 formed in the vertical side wall 14 to which may be attached an auger arrangement to facilitate removal of the contents of grain trailer 10 to a more remote location. Auger opening 62 may be provided with a cover 64, as desired.

The rear door opener assembly of grain trailer 10 will now be described more particularly in connection with FIG. 8. The opener assembly for rear door 29 includes a handle 56 for manual rotation of a shaft 88 which is axially extended through and movable within a stationary coupling or sleeve 86. Attached to sleeve 86 and responding to the rotational movement thereof may be a chain or rope coupling 94 and corresponding door opener actuator 96. The inoperative position of handle 56 and shaft 88 are indicated in FIG. 8 in dotted outline and by reference numerals 56' and 88', which position is normally used when grain trailer 10 is in motion to withdraw handle 56 to safe position 56'.

Figure 9:
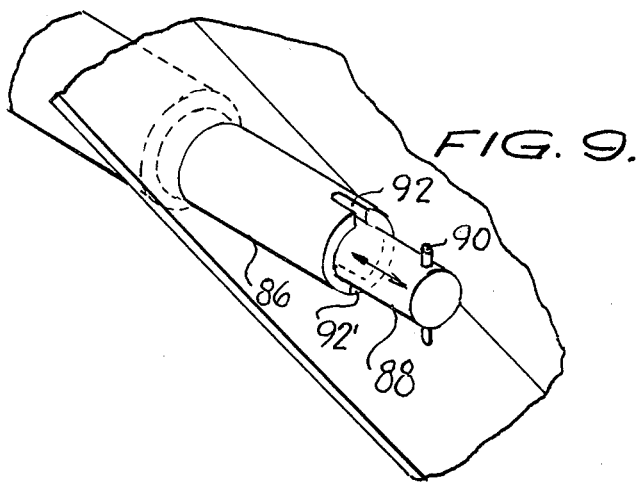
FIG. 9 is a perspective view illustrating in more detail the rear door assembly structure of the embodiment illustrated in FIG. 8.

The operative interconnection between shaft 88 and sleeve 86 is illustrated in somewhat more detail in FIG. 9. A pin 90 is transversely positioned through the free end of the shaft 88. Coupling or sleeve 86 has a pair of pin-receiving slots 92 and 92' oppositely located on the peripheral edge thereof so as to accomodate cross pin 90 when in its left-most position as viewed in FIG. 8. When so coupled, rotation of handle 56 will cause coupling 86, and hence couplings 94, to actuate actuator 96 to open or close door 29. When in its inoperative position, as indicated in FIG. 8 in dotted outline and in FIG. 9, rotary movement of shaft 88 will have no effect upon the opening or closing of door 29.

The vibrator bar assembly of the present invention is indicated generally in FIGS. 1 and 2 by reference numeral 100. Vibrator bar assembly 100 is seen to extend generally the entire length of inclined bottom wall 26 from the front wall 18 of grain trailer 10 down to the opening 28 located in the bottom portion thereof. The structure and operation of vibrator bar assembly 100 will now be explained in more detail with reference to FIGS. 3 through 6, to which attention is now directed.

The vibrator bar assembly comprises a motor 102 which is shown mounted externally of the grain trailer proper on a mounting plate 104 which is secured to the front wall 18 of grain trailer 10. Motor 102 is preferably a 12 volt DC electric motor which is connected to the trailer vehicle's battery (not shown) through an on-off switch (not shown).

The shaft 105 of the motor 102 is coupled to a driven shaft 106 via a flexible coupling 148. Driven shaft 106 extends from the flexible coupling 148 longitudinally approximately two-thirds the length of the lower inclined wall 26 of grain trailer 10.

An elongated cover or vibrator bar 116 is mounted to the interior of the bottom inclined surface 26 of grain trailer 10 and extends from a point just adjacent the front wall 18 downwardly, substantially parallel to bottom wall 26, to a point approximately two-thirds of the way rearwardly so as to cover a major portion of the inclined length of bottom wall 26.

Vibrator bar or cover 116 may be attached to inclined surface 26 by any of a number of conventional structures, one of which is illustrated in the drawings as comprising a plurality of L-shaped guides 134, 136, 138 and 140 which are welded at spaced locations along the length of vibrator bar 116 and are mounted via a plurality of rubber mounts 126, 128, 130 and 132 to the inclined surface of bottom wall 26. Also serving to retain the vibrator bar 116 to bottom wall 26 near the end thereof coupled to motor 102 is a transversely positioned elongated retainer bar 142 which may be bolted through rubber mounts 144 and 146 to the bottom wall 26.

The frontal interior portion of bar 116 may include an opening 150 formed therein for visual and manual access to flexible coupling 148 for easy servicing thereof.

The driven shaft 106 is firmly attached to the vibrator bar 116 disposed thereover by a plurality of bearings 118, 120, 122 and 124 disposed at various points along the length of shaft 106. Intermediate the bearings 118, 120, 122 and 124 are disposed a plurality of eccentric weights 108, 110, 112 and 114 which are held in place on shaft 106 by, for example, associated set screws, such as screws 162 and 164 of weights 112 and 114 as viewed in FIG. 6.

Vibrator bar 116 may extend, if desired, the entire inclined length of bottom wall 26 all the way to the lower edge 98 of opening 28. Alternatively, as illustrated in this preferred embodiment, the vibrator bar 116 may terminate somewhat short of lower edge 98 and may have extending from the free end thereof a pair of rod-like tubular members 154 and 156, whose function will become more clear hereinafter.

In operation, actuation of motor 102 will cause its shaft 105 to rotate, which rotation is coupled via coupling 148 to driven shaft 106. The presence of the plurality of eccentric weights 108 through 114 will cause the driven shaft 106 to vibrate, the amount of vibration being dependent upon the number, positioning, and individual design of the weights. The vibrations of shaft 106 will be directly coupled to vibrator bar 116 via the bearings 118 through 124, thereby causing bar 116 to vibrate. By virtue of the attachment of bar 116 to the inclined wall 26 via L-shaped guides 134 through 140 and retainer bar 142, the inclined wall 26 is also caused to vibrate somewhat. Finally, the elongated rods 154 and 156, connected to bar 116 via bearing 124, are also caused to vibrate, even moreso than the structure heretofore described due to their free ends which lie adjacent opening 28.

While the majority of the grain contained in trailer 10 will empty through opening 28 as a result of gravitational forces (on the order of 80%), the remaining 20% or so of the grain will require the vibrator assist in order to be emptied through the opening 28. The effectiveness of the unique vibrator assembly heretofore described is believed to result from its effective placement along the entire inclined interior length of bottom wall 26, along with its direct contact with the material being emptied. The latter serves as a direct and effective stimulus for expedient and efficient emptying of the entire contents of grain trailer 10 through opening 28. The rods 154 and 156 in particular assist in the final emptying of the grain with minimum resistance and maximum vibration.

The grain trailer 10 of the present invention may typically be on the order of 12 feet in length and 8 feet in width, the tow bar assembly 30 extending some 7 feet in front of the front wall 18. The upper edge of opening 17 preferably extends approximately 7½ feet from the ground. The bottom inclined wall 26 is angled at approximately 20° from the horizontal, while side walls 20 and 22 are inclined at approximately 30° angles and rear wall 24 is inclined at approximately a 40° angle from the horizontal. The front wall 18 is approximately 2 feet in height, while the rear wall 16 has a height of about 4 feet, the lower point 98 of opening 28 extending some 2 feet below the rear wall 16. The vibrator bar 116 is itself approximately 8 feet long and 8 inches wide, rods 154 and 156 extending therefrom each being approximately 3 feet long.

Obviously, numerous modifications and variations of the present invention are possible in light of the above teachings. I therefore wish it to be understood that I do not desire to be limited to the exact details of construction shown and described, for obvious modifications and variations will be apparent to a person of ordinary skill in the art.

I claim as my invention:

1. A material carrier, which comprises:
a container for material which includes a bottom wall
    inclined so as to substantially gravity feed the contents of said container to an opening formed in the lower portion thereof, and vibrator means mounted on the interior surface of said inclined bottom wall for assisting in the emptying of said material through said opening, said vibrator means comprising an elongated vibrator bar attached to the interior surface of said inclined bottom wall, a motor having a driven shaft, a drive shaft extending longitudinally between said vibrator bar and said inclined bottom wall, means for coupling said driven shaft with said drive shaft and eccentric weight means mounted to said drive shaft for causing same to vibrate when rotating and bearing means for coupling the vibratory motion of said drive shaft to said vibrator bar.

2. The material carrier as set forth in claim 1, wherein said container further comprises a front wall, a rear wall, and a pair of side walls, all substantially vertically oriented, and wherein said inclined bottom wall downwardly slopes from said front wall rearwardly to said opening which is positioned substantially rearwardly of the midlength of said container.

3. The material carrier as set forth in claim 2, wherein the downward slope of said bottom wall, measured from the horizontal, is approximately 20°.

4. The material carrier as set forth in claim 2, wherein the height of said front wall is approximately one half the height of said rear wall, said front and rear walls being substantially parallel and extending between respective edges of said pair of side walls.

5. The material carrier as set forth in claim 2, wherein said vibrator bar extends substantially the entire length of said inclined bottom wall from said front wall to said opening.

6. The material carrier as set forth in claim 1, wherein said vibrator means further comprises at least one rod-like elongate member connected to and extending from an end of said elongate vibrator bar.

7. The material carrier as set forth in claim 1, wherein said vibrator bar is spaced from and substantially parallel to the interior surface of said inclined bottom wall and is attached thereby by means of a plurality of flanges positioned along the length thereof.

8. The material carrier as set forth in claim 1 further comprising a retainer bar fixedly secured and transversely positioned with respect to said vibrator bar.

9. The material carrier as set forth in claim 1, wherein said material carrier comprises a vehicular grain trailer.

10. The material carrier as set forth in claim 9, wherein said grain trailer includes an auger opening located in one of the side walls thereof.

11. The material carrier as set forth in claim 10, wherein said grain trailer includes a front jack assembly having a rotating handle for actuation thereof which is pivotable out of the way when not in use.

12. The material carrier as set forth in claim 11, wherein said grain trailer includes a rear door covering said opening and means for opening and closing said rear door, said opening and closing means comprising a rotatable shaft laterally displaced from said rear door, means coupling the rotational movement of said shaft to said rear door, and manually actuable means for selectively rotating said shaft.

13. The material carrier as set forth in claim 12, wherein said manually actuable means comprises a drive shaft having a handle formed at one end thereof, the distal end of which includes a transversely positioned pin formed therethrough which selectively engages a similarly sized pin-receiving slot formed in the cooperating end of said rotatable shaft, said drive shaft being axially moveable with respect to said rotatable shaft for selective engagement therewith.

14. An apparatus, which comprises:

a vehicular grain trailer comprising a material container mounted on a wheeled frame, said container having a front wall and a bottom wall inclined so as to substantially gravity feed the contents of said container to an opening formed in the lower portion thereof;

a material agitator positioned adjacent and mounted to the interior surface of said inclined bottom wall and extending substantially the entire length of said inclined bottom wall from said front wall to said opening;

a vibrator positioned within said container and comprising a drive shaft extending between said material agitator and said inclined bottom wall, and a motor for driving said drive shaft and being positioned externally of said container; and means for directly coupling said vibrator to said material agitator for causing the latter to vibrate and thereby assist in the emptying of said material from said vehicular grain trailer.

* * * * *